United States Patent [19]

Schlesinger

[11] Patent Number: 4,962,449
[45] Date of Patent: Oct. 9, 1990

[54] COMPUTER SECURITY SYSTEM HAVING REMOTE LOCATION RECOGNITION AND REMOTE LOCATION LOCK-OUT

[76] Inventor: Artie Schlesinger, 825 E. 9th St., Brooklyn, N.Y. 11230

[21] Appl. No.: 180,089

[22] Filed: Apr. 11, 1988

[51] Int. Cl.$^5$ .................. G06F 15/00; G06F 12/14
[52] U.S. Cl. .................. 364/200; 364/286.4; 364/286.5; 364/261; 364/238.1; 340/825.31; 340/825.34; 380/25; 235/382
[58] Field of Search ... 364/200 MS File, 900 MS File; 340/825.31, 825.34; 379/95; 380/25; 235/379, 382

[56] References Cited

U.S. PATENT DOCUMENTS

| | | | |
|---|---|---|---|
| 4,430,728 | 2/1984 | Beitel et al. | 364/900 |
| 4,494,114 | 1/1985 | Kaish | 340/825.31 |
| 4,525,712 | 6/1985 | Okano et al. | 340/825.31 |
| 4,601,011 | 7/1986 | Grynberg | 364/900 |
| 4,649,533 | 3/1987 | Chorley et al. | 370/58 |
| 4,652,698 | 3/1987 | Hale et al. | 380/24 |
| 4,672,533 | 6/1987 | Noble et al. | 364/200 |
| 4,694,492 | 8/1987 | Wirstrom et al. | 380/23 |
| 4,719,566 | 1/1988 | Kelley | 340/825.34 X |
| 4,780,821 | 10/1988 | Crossley | 364/200 |
| 4,783,798 | 11/1988 | Leibholz et al. | 380/23 |
| 4,882,752 | 11/1989 | Lindman et al. | 380/25 |
| 4,887,292 | 12/1989 | Barrett et al. | 340/825.31 X |
| 4,897,874 | 1/1990 | Lindinsky et al. | 340/825.31 X |

OTHER PUBLICATIONS

Brachtl et al., "Global Key Protection", IBM TDB, vol. 27, No. 9, Feb. 1985, pp. 5382-5383.
Gillard and Smith, "Computer Crime: A Growing Treat," BYTE, Oct. 1983, pp. 398-424.

*Primary Examiner*—Thomas C. Lee
*Attorney, Agent, or Firm*—Kenyon & Kenyon

[57] ABSTRACT

An apparatus is provided that enables a computer system access procedure to be secure from hackers and other potential unauthorized computer system users. The invention's features include a switchboard, a centralized security interface, which interacts with a location recognition device at each remote location. Security is provided by secure and easily changeable location recognition device initialization, the transmission of a unique location security code from each location recognition device to the switchboard, and location recognition device immobility through the use of volatile memory. Unauthorized computer system access is prevented by a switchboard access protocol that uses a relationship between location security codes and personal identification codes to limit specific computer system users to specific remote locations and to lock-out, from computer system access, any remote location or analog thereof that the switchboard determines is being used by a hacker or other unauthorized user.

7 Claims, 2 Drawing Sheets

COMPUTER SECURITY SYSTEM HAVING REMOTE LOCATION RECOGNITION AND REMOTE LOCATION LOCK-OUT

FIELD OF THE INVENTION

This invention relates to a computer network with multiple remote terminals or workstations. More specifically, the invention is directed to a computer security system for the prevention of unauthorized access to a computer and its stored information from remote locations either within or without the defined boundaries of the network of which such computer is a component.

BACKGROUND OF THE INVENTION

A computer network is typically comprised of the computer itself (comprised of a central processing unit (CPU), memory, etc.) in combination with mass data storage devices such as tape or disk systems, a multiplicity of input/output (I/O) devices such as line printers and remote video display terminals or workstations (cathode ray tubes for output and typewriter-type keyboards for input), and operating and applications software.

Many computer networks are configured to include the computer and its data storage devices in a central location with the I/O devices at various remote locations near the people who have need to access the computer and its stored information. The I/O devices in such networks are typically connected to the computer and its data storage devices (the terms "computer system" and "system" as used hereinafter refer to the computer and its data storage devices collectively) by ordinary telephone lines. The use of telephone lines allows easy and flexible access to the computer system; wherever there is a telephone, computer system access is possible. However, the use of telephone lines to facilitate computer system access also creates the potential for unauthorized computer system access.

Often, a computer system is used to store and manipulate secret or confidential information. Such information can, for example, take the form of trade secrets, commercial marketing information, or sensitive governmental or military information. Quite naturally, the owners of such computer systems containing secret or confidential information are concerned about the maintenance of computer system security. Since the computer and its data storage devices are often kept in a secure area, the greatest threat to system security is unauthorized system access from remote locations (that is, locations spatially removed from the area securing the computer and its data storage devices), either within or without the defined boundaries of the computer network, such as any location with telephone service.

Since users of remote I/O devices can gain access to computer systems by as simple a means as the dialing of a telephone number, computer system owners and those charged with system security have devised several schemes that inhibit unauthorized and illegal access.

One such scheme involves the elimination of telephone line use entirely. That is, an I/O device at a remote location (for example, at a user's desk or home) is connected to the computer system by a communications circuit dedicated to private computer system usage. This scheme eliminates the possibility of unauthorized telephone access but fails to account for the possibility of an unauthorized user located at an authorized remote location. Additionally, this scheme proves quite expensive to establish and maintain while failing to offer the flexibility of commercial telephone communications circuits.

Another security scheme involves the use of personal identification codes (PICs) or passwords. A PIC is a string of alphanumeric characters that is presumed to be known only to an authorized user of the computer system. With this scheme, anyone attempting to access the computer system must enter (i.e., supply to the computer system) a PIC so the computer system will be able to recognize that person as an authorized user. The security afforded by this scheme is predicated on a computer system's storage of valid PICs. The PIC scheme, however, fails to completely address the problem of unauthorized commercial telephone line computer system access. Unauthorized users employing brute force trial-and-error can, from a remote I/O device, uncover valid PICs. Authorized users, who are often left to select their own PICs, tend to select simple easy-to-remember character strings: usually words. Unfortunately, such PICs are relatively easy to uncover through educated guessing. Consequently, while the PIC scheme affords some protection, it is far from a panacea.

Another security scheme that has been developed would be properly referred to as Telephone Authorization (TA). With TA, security is predicated on access from an authorized telephone (and is not predicated on the authorization of the user). One TA scheme employs direct-dial telephone access to a special interface between the prospective user's telephone and the computer system. The interface answers a given call to the computer system and receives from the prospective user a special code, signaled from the prospective user's telephone keypad, identifying the telephone of the prospective user. At this point, the prospective user hangs up and the special interface determines whether the transmitted code identifies an authorized telephone. If the code received from the prospective user does in fact identify an authorized telephone, the interface dials the telephone number of the authorized telephone for the ultimate purpose of allowing computer system access. The user answers and uses the telephone connection in the normal manner well known in the art to achieve remote computer system access. The first problem with TA lies in the simplicity of its telephone identification code. Since the code must be entered by a prospective user, it cannot be so complex that it is difficult to remember or dial. Consequently, it is not difficult for a prospective unauthorized user, at the authorized telephone's location, to determine such code through the brute-force technique discussed above. In addition, TA both requires the presence of a telephone handset at each remote location and takes the time to make and receive two telephone calls. Furthermore, TA fails to account for the possibility of phone line rerouting.

For further background on the problems associated with computer security and on the prior art, see Gillard and Smith, "Computer Crime: A Growing Threat", BYTE, October, 1983 at page 398.

Consequently, with the limitations of the present state of the art in mind, it is an object of the present invention to provide a system for secure computer system access.

It is also an object of the present invention to provide a system for secure computer system access that preserves the desirable use of telephone line remote I/O device access.

It is a further object of the present invention to provide a system for secure computer system access that preserves the desirable use of telephone line remote I/O device access while eliminating the inadequacies of current PIC or TA security schemes.

Still other and further objects of the present invention will be apparent to those skilled in the art from the description of the present invention provided herein.

SUMMARY OF THE INVENTION

The present invention provides two security devices —a Switchboard and a Location Recognition Device—that, in combination, prevent unauthorized computer system access. Such unauthorized access is prevented in part by the Location Recognition Device's initialization, transmission of a special Location Security Code to the Switchboard, and immobility from its initialization location. Such unauthorized access is further prevented by the use of user Personal Identification Codes, as part of the Switchboard's access protocol, to limit particular users to particular remote Input/Output devices. A correspondence is established in the Switchboard's memory between the lengthy, electronically entered (and, therefore, always correctly transmitted) Location Security Code and its related, manually entered user Personal Identification Codes. This correspondence enables the Switchboard to "intelligently" recognize that an unauthorized user is attempting to gain access to the secure computer system and to deny access to such unauthorized user. Finally, such unauthorized access is prevented by the fact that the volatile memory that immobilizes a Location Recognition Device also enables a compromised Location Security Code to be easily changed.

DESCRIPTION OF THE PRESENT INVENTION

At the outset, it will be instructive to define certain terms.

The term "security system" used herein refers to the Switchboard in combination with any or all of the Location Recognition Devices (LRDs).

The term "interface" used herein refers to an element of a network, comprised of hardware, software, or a combination of both, that is physically or logically interposed between two other elements of the network. The interface, connected to these elements, may accomplish data processing and/or act as a conduit for information transfer between the two connected elements.

The term "location identification number" (LIN) used herein refers to an alphanumeric character string that identifies the location of a particular LRD.

The terms "serial number" (SN) and "location security code" (LSC) used herein refer to alphanumeric character strings that identify a particular LRD. It is preferred that the LSC differ from the SN. The preference is for an SN composed of a relatively few characters (on the order of 50 characters) and an LSC composed of a relatively large number of characters (on the order of several hundred characters), both pseudo-randomly generated. Pseudo-random code generation techniques are well known in the art.

The term "authorized" used herein in conjunction with LINs, SNs, LSCs, PICs, LRDs, or users is meant to denote those codes, devices, or people that are correctly and properly a part of or users of the security system or secure computer system.

The term "unauthorized" used herein in conjunction with LINs, SNs, LSCs, PICs, LRDs, or users is meant to denote those codes, devices, or people that are neither correctly or properly a part of nor users of the security system or secure computer system.

The term "personal identification code" (PIC) used herein refers to an alphanumeric character string that identifies a particular authorized computer system user. It is preferred that there be more than one PIC per authorized user, but that each PIC be simple enough to be memorized.

Figure 1:
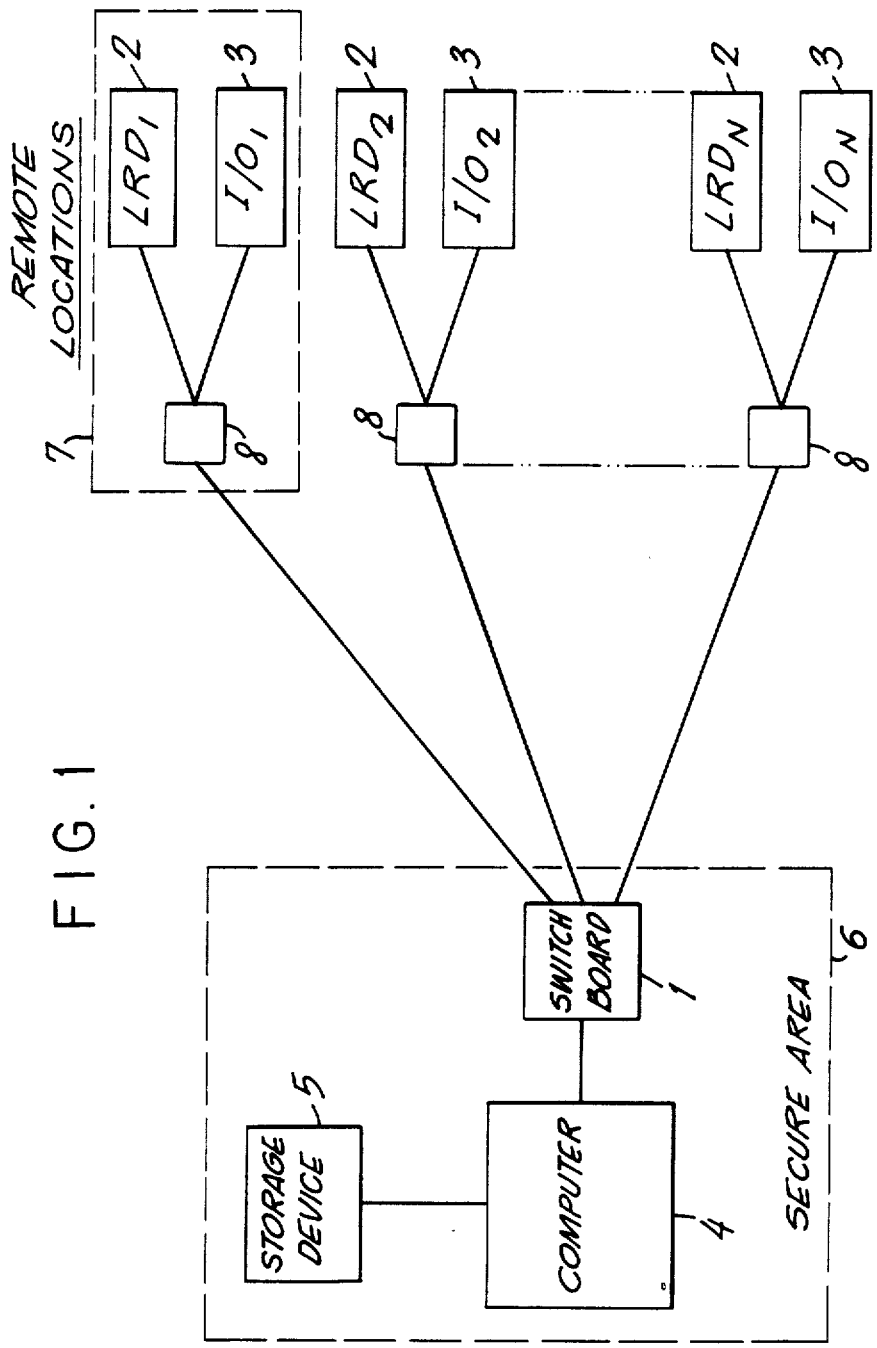
FIG. 1 is a schematic diagram of the basic elements of this invention in their preferred embodiments, in combination with the usual well known elements of a computer network.

Referring to FIG. 1, the present invention involves the use of a Switchboard (1) and an LRD (2). The Switchboard (1) is a centralized security interface located in the same secure area (6) as the computer (4) and its data storage devices (5). Together, the computer (4) and its data storage devices (5) comprise the computer system (system) (4, 5) for purposes of this description. The Switchboard (1) performs all security tasks required by this invention to be accomplished at the secure location (6), and functions as an interface between remote locations (locations) (7), to which it is connected via a telephone communications circuit, and the central computer (4) for those remote locations (7) that require telephonic data communication. Computer telephonic data communication through the use of a MODEM and encoding techniques such as frequency shift keying is well known in the art.

It should be understood that the Switchboard (1) may be embodied as computer hardware and/or software. That is, the software aspects of the Switchboard (1) may be embodied in either the computer system (4, 5) itself or, preferably, a separate dedicated computer within the secure location (6). Although a Switchboard (1) embodiment in a separate dedicated computer, which would isolate the Switchboard's (1) operating system and memory contents from all computer system (4, 5) users, is the preferred alternative because it creates a maximally secure situation, if the owners of a computer system (4, 5) are not particularly worried about the honesty of internal personnel, a less costly Switchboard (1) embodiment in the computer system (4, 5) itself may be preferable.

A Switchboard (1) embodiment in a separate dedicated computer requires protection against memory loss due to power failure. Such protection may be provided by either a dedicated disc drive built into such computer solely for storage of a back-up copy of the Switchboard's (1) security map, a back-up power supply, or, preferably, a combination of both.

The LRD (2) is a security interface located proximately to or incorporated into a remote I/O device (3). Together, the LRD (2) and I/O device (3) comprise a remote location's (7) workstation (7) for purposes of this description. The LRD (2) performs all security tasks required by this invention to be accomplished at the remote location (7) not related to user data entry and is connected to the Switchboard (1) via the above mentioned telephone communications circuit which may include a communications coupler (8).

One embodiment of a proximately located LRD (2) is as an interface between the Switchboard (1) and the LRD's (2) associated I/O device (3). In this configuration the LRD (2) performs the same functions as those described herein while acting as a conduit for all data, including LIN and PIC data, input from the I/O device (3) to be transmitted to either the Switchboard (1) or the secure computer system (4, 5).

However, regardless of an LRD's (2) embodiment, it is intended that the LRD (2) and its associated I/O device (3) be isolated from each other while either is functioning. That is, there should be no data pathways between the devices during either security system or I/O device operation.

Although it is possible with any LRD (2) embodiment to cause an LRD (2) to function either manually (by user operation) or automatically (by prompting from the Switchboard (1)), the manual method is preferred as it is cost efficient.

Should the manual method of causing an LRD (2) to function be chosen, it is preferred that selection of function be accomplished through the use of an accident preventing multi-position key-lock switch rather than by, for example, a series of unlocked switches or push buttons.

The security afforded by the present invention is achieved through a combination of security system initialization and security system operation.

Initialization of the security system is accomplished in two parts. The first part is the initialization of the Switchboard (1). The second part is the initialization of each and every LRD (2) for use in accessing the secure computer system (4, 5) from a remote location (7).

Switchboard Initialization

Figure 2:
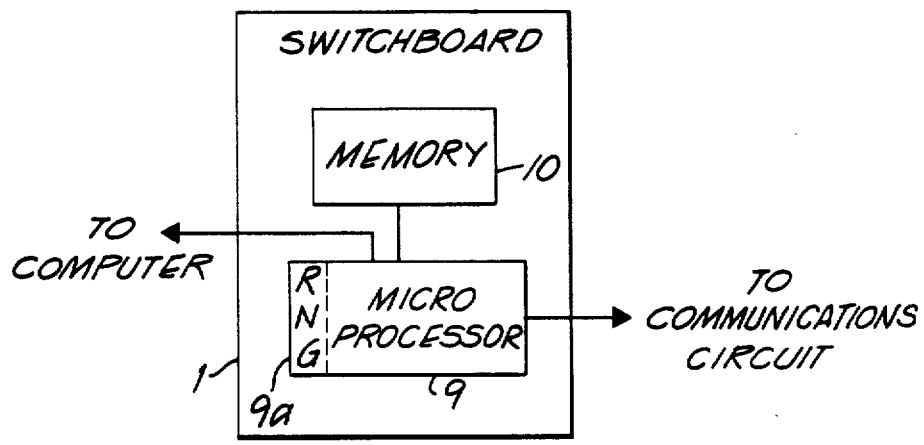
FIG. 2 is a schematic diagram of a Switchboard.

Switchboard (1) initialization is accomplished by a mapping, within the Switchboard's (1) memory (10) (see FIG. 2), of each and every workstation's (7) location identification number (LIN) to a corresponding LRD (2) (identified by its serial number (SN) and location security code (LSC)) and the corresponding personal identification codes (PICs) of the workstation's (7) authorized user(s). By way of example, this initialization may be accomplished through the creation of a look-up table, stored in the Switchboard's (1) memory (10), that allows a straightforward correspondence between a given workstation's (7) LIN, its corresponding LRD's (2) SN and LSC, and the corresponding PICs of the workstation's (7) authorized user(s). A table or security map such as this may be represented as follows:

| Location ID Number | Serial Number | Location Security Code | Personal Identification Codes | | |
|---|---|---|---|---|---|
| $LIN_1$ | $SN_1$ | $LSC_1$ | $PIC_{11}{}^u$ | $PIC_{12}{}^u$ | $\ldots PIC_{1m}{}^u$ |
| $LIN_2$ | $SN_2$ | $LSC_2$ | $PIC_{21}{}^u$ | $PIC_{22}{}^u$ | $\ldots PIC_{2m}{}^u$ |
| . | . | . | . | . | |
| . | . | . | . | . | |
| . | . | . | . | . | |
| $LIN_n$ | $SN_n$ | $LSC_n$ | $PIC_{n1}{}^u$ | $PIC_{n2}{}^u$ | $\ldots PIC_{nm}{}^u$ |

Thus, for each $LIN_n$, there is a corresponding $SN_n$, $LSC_n$, and $PIC_{nm}{}^u$ (note that superscript u, which may be, for example, an employee identification number, indexes users; thus, for a given LRD (2) there may be several authorized users).

Such mapping (initialization of the Switchboard (1)) may, for example, be performed at the time of Switchboard (1) system installation at the secure location (6) with the requisite information being entered into the Switchboard's (1) memory circuitry (10) by security personnel as part of a data input procedure. The data for the security map may be entered via a typewriter-type keyboard, read from a magnetic tape, or received from any other data input device (for example, conventional punch-card or paper tape readers or the more recent magnetic card readers (used typically to read data stored on a plastic card containing a magnetic strip, for example, a credit card)). Alternatively, security map information relating to each workstation's (7) location, LRD (2), and user(s) may be entered by security personnel through the use of said workstation's (7) I/O device (3). The preferred method of entering security map data into the Switchboard's (1) memory (10), however, is in the manner hereinafter described.

The first step of the preferred method of entry of the security map data relating to a workstation (7) is the entry of such workstation's (7) LIN by security personnel via one of the mechanisms described above. Next, the corresponding SN of the authorized LRD (2) located at such workstation (7) is entered, also by security personnel, preferably via a magnetic card reader. The third step in this data entry procedure is the automatic generation and entry by the Switchboard (1) itself of an LSC to correspond with the previously entered LIN/SN combination. The LSC is generated by a pseudo-random number generator (9a) within the Switchboard (1). Finally, after the LIN, SN, and LSC relating to workstation (7) have been entered the identity(ies) (employee number(s), for example) and corresponding PICs of the authorized user(s) of such workstation (7) are entered directly by such user(s) via one of the mechanisms described above. Upon the entry of the LIN of a workstation (7), the Switchboard (1) enters "initialization mode" with respect to the LRD (2) located at such workstation (7). That is, the Switchboard (1) responds to an access request from such workstation (7) in accordance with the LRD (2) initialization procedures hereinafter described, but only if its security map data for such workstation (7) is complete (i.e., includes LIN, SN, LSC, and PICs). If either the SN (and, therefore, LSC) or PICs are lacking, the Switchboard (1) disconnects itself from the telephone communications circuit over which an authorized LIN was transmitted.

If the PICs are deleted from an initialized LRD's (2) workstation's (7) security map data, the Switchboard (1) reverts from "operational mode" (as hereinafter described) to initialization mode with respect to the initialized LRD (2) and, in the process, clears such LRD's (2) existing LSC from its security map and generates a new one, thus necessitating reinitialization of such LRD (2).

It should be noted that in the preferred embodiments, the entry of data by means of the preferred method will ensure that SNs, LSCs, and PICs are entered into the Switchboard's (1) memory (10) and stored therein in such a manner as to maintain them in secrecy from all computer system (4, 5) users.

Depending upon the security requirements of a given computer system (4, 5) installation, the security map of the Switchboard (1) may be initialized to include special "time interval" data to indicate the time frames within which each authorized user may access the computer system (4, 5). The Switchboard (1) would have the responsibility of determining whether an authorized user (identified by his PICs) attempting to access the system (4, 5) is in fact authorized to access the system (4, 5) at that time and of responding to untimely access requests in accordance with such applicable procedures as may be designed into its access protocol (for example, by denying system (4, 5) access).

LRD Initialization

The second part of the initialization of the security system is the initialization of each LRD (2). This initialization is accomplished in two stages. In the first stage, each LRD (2) is loaded with its SN. The SN may, for example, be loaded as part of the LRD (2) manufacturing process, wherein a memory device (for example, a Read Only Memory) is loaded with the SN and subsequently installed into the LRD (2). Or, the LRD (2) may be loaded with its SN by security personnel through the use of the LRD's (2) associated I/O device (3). Further, the LRD (2) may be loaded with an SN transmitted to the LRD (2), over the telephone communications circuit, by the Switchboard (1).

Figure 3:
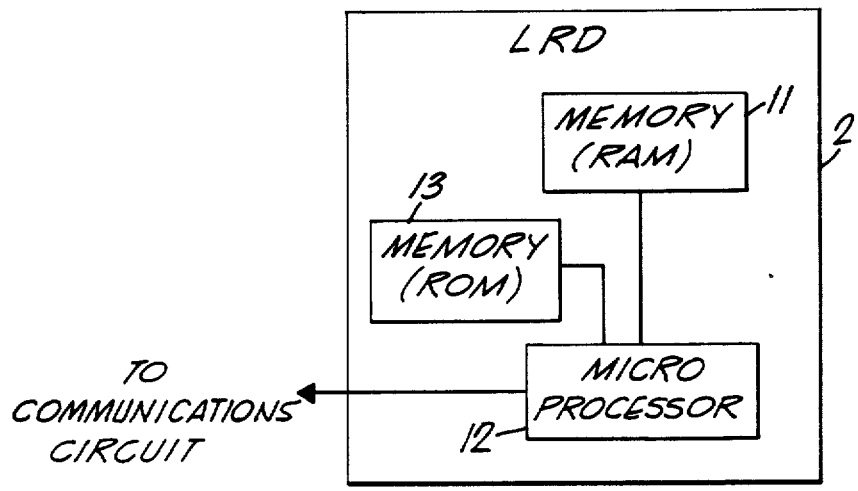
FIG. 3 is a schematic diagram of a Location Recognition Device.

While the secure loading of data (in this case the SN being loaded into the memory (13) (see FIG. 3) of the LRD (2)) is the ultimate goal, and though any of the above mentioned techniques will suffice, the use of the memory device method is preferred because of the permanence it imparts to an SN.

If the memory device method of loading the SN is chosen, it is preferred that an LRD's (2) manufacturer record such SN on a plastic card containing a magnetic strip for data storage for recording in the Switchboard's (1) security map through the use of a magnetic card reader. The SN should not be physically shown on the card.

In the second stage of LRD (2) initialization, each LRD is loaded with its LSC. This LSC must correspond to the particular LRD's (2) LIN and SN, the correct correspondence being that recorded in the Switchboard's (1) memory circuitry (10) upon its initialization (recorded in the security map).

As with the loading of the SN in the LRD (2), the loading of the LSC in the LRD (2) may, for example, be accomplished as part of the LRD's (2) manufacturing process, wherein a memory device (for example, a Read Only Memory) containing the LSC for the LRD (2) in question is installed as part of the LRD's (2) memory circuitry. Or, the LSC may be loaded by security personnel directly through the use of the LRD's (2) associated I/O device (3). However, the preferred method of loading the LSC is through the interaction of the LRD (2) with a previously initialized Switchboard (1).

With this method, an LIN is input at a remote workstation (7) through security personnel's use of the workstation's (7) I/O device (3). The LIN is transmitted to the Switchboard (1) over the telephone communications circuit. The transmitted LIN is then compared to the LINs stored in the Switchboard's (1) security map. The Switchboard (1) makes a determination as to whether the transmitted LIN matches an LIN in the security map (i.e., determines whether the LIN is authorized). If so, and if the Switchboard (1) is in initialization mode with respect to the LRD (2) identified by such authorized LIN, the Switchboard (1) signals the aforementioned security person to initiate transmission of the LRD's (2) SN by, for example, pushing a control button on the LRD (2) that causes the SN to be transmitted by the LRD (2). If the Switchboard (1) determines by reference to its security map that the transmitted SN corresponds to the stored SN of the authorized LRD (2) just identified (i.e., is authorized) (the particular row of the security map containing the stored SN used for the comparison is identified by the previously transmitted LIN), the Switchboard (1) signals the security person to prepare for the LRD's (2) reception of an LSC. Upon receiving confirmation from the security person, the Switchboard (1) transmits to the LRD (2) an LSC which the LRD (2) receives and stores in its memory (11). Upon the transmission of such LSC, the Switchboard (1) changes its status with respect to the LRD (2) thus initialized from initialization mode to "operational mode", thus enabling the Switchboard (1) to allow the workstation (7) at which such LRD (2) is located to access the secure computer system (4, 5). It should be noted that the LRD (2) initialization procedure as described allows for the initialization of only one LRD (2) identified by a particular LIN/SN combination. Also, upon receiving any unauthorized LIN or SN transmitted during an LRD (2) initialization procedure, the Switchboard (1) disconnects itself from the telephone communications circuit over which such unauthorized LIN or SN was transmitted. It should be understood that techniques of digital data communication and the use of sorting algorithms to facilitate computer searches are well known in the art.

It should also be noted that in the preferred embodiments, the loading of data by means of the preferred methods will ensure that SNs and LSCs are entered into the LRD's (2) memories (13 and 11) and stored therein in such a manner as to maintain them in secrecy from virtually all computer system (4, 5) users.

If either the preferred method (interaction with the Switchboard (1)) or the direct method (loading via the workstation (7) I/O device (3)) is chosen for loading the LSC, it is preferred that the memory (11) employed in the LRD (2) be volatile. That is, the memory (11) should store the LSC only for as long as main electrical power is maintained to the LRD (2). Such memory (11) should not have any back-up power supply, such as, for example, a battery. Should the LRD (2) lose main power, it is intended that the LSC be lost from the LRD's (2) memory (11). The use of volatile memory will ensure that an LRD (2) cannot be moved from its initialization location and still access the secure computer system (4, 5) without proper reinitialization. The use of volatile memory will also enable an LRD's (2) memory (11) to be cleared should reinitialization become necessary.

In some instances, computer system (4, 5) management personnel may find it desirable for certain key system (4, 5) users to have the ability to access the protected system (4, 5) from locations without its boundaries (i.e., from locations not equipped with authorized LRDs (2), but having I/O devices). Such individuals may be provided with portable LRDs (2), thus creating movable locations. Such portable LRDs (2) should, preferably, be similar in construction, function, and operation to the previously described immovable LRDs (2), except that they should be battery powered and include sufficient back-up power to enable their batteries to be changed without their LSCs being lost from memory.

Once an LSC is stored by each LRD (2), LRD (2) initialization is complete and the security system is in place. With the system in place, access from remote workstations (7) is secure. In the preferred embodiments, no reinitialization of the system is ever required during the normal course of its operation as long as power is maintained to the LRDs (2). It is important to understand that in the preferred embodiments, security system initialization, be it of the Switchboard (1) or an LRD (2), can be initiated only from the Switchboard (1) in its secure location (6) and not from a remote workstation (7). This ensures the greatest level of security by limiting the storage of security map data, in the preferred embodiments, to the supervision of security personnel. This limitation, in turn, preserves the integrity of the LSC volatile storage scheme by preventing an unsupervised LRD (2) reinitialization after an LRD (2) has been physically moved (i.e., disconnected from electrical power).

Security System Operation

A prospective system user, in order to access the secure computer system (4, 5) from a remote operational workstation (7), must first transmit to the Switchboard (1) a workstation (7) LIN. This involves, at the outset, the establishing of communication between the remote workstation (7) and the Switchboard (1) over a telephone communications circuit. Such an establishment is accomplished by computer-to-computer communication techniques well known in the art. It is preferred that an LIN be posted at its workstation (7) location and entered manually through the workstation's (7) I/O device (3) for transmission to the Switchboard (1) via the telephone communications circuit. Once received by the Switchboard (1), the transmitted LIN is compared by the Switchboard (1) to the various LINs stored in its security map for the purpose of determining whether the transmitted LIN is authorized (i.e., matches an LIN stored in such security map). Should the transmitted LIN fail to match a stored LIN (i.e., be unauthorized), the Switchboard (1) terminates the access request by terminating communication with (i.e., "hanging-up" on) the telephone communications circuit over which the unauthorized LIN was transmitted. Should, however, the transmitted LIN prove to be authorized, the Switchboard (1) signals the prospective user of this by requesting transmission over the telephone communications circuit of the (LRD's (2)) LSC that corresponds with such authorized LIN (i.e., matches the LSC stored in the Switchboard's (1) security map in the particular row identified by such LIN). The prospective user then initiates transmission of the LSC by activating the LRD (2) by means of a control button and causing it to transmit the LSC. The LRD (2), once activated, reads the LSC from its memory (11) and transmits the datum to the Switchboard (1). The read and transmission may be accomplished in many ways well known in the art and no particular way is preferred. Typically, such tasks are accomplished by a microprocessor (12), executing microcode, performing the reading and formatting of the data, in combination with a MODEM, connected to the communications circuit, performing the data transmission. It should be understood that the Switchboard (1) may signal the LRD (2) directly, thus prompting the transmission of the LSC automatically. Once in receipt of the LSC, the Switchboard (1) determines whether such transmitted LSC is authorized (i.e., matches the previously identified stored LSC). Depending on how the Switchboard (1) is embodied (in a separate computer/microprocessor (9) and memory (10) or in the secure computer system (4, 5) itself), the means of performing the LIN and LSC comparisons may vary and, in any event, are well known in the art. Should the preferred embodiment be employed—a separate computer/microprocessor (9) and memory (10) as the Switchboard (1)—the typical processing unit (9) would execute software for reading the LINs or LSCs stored in the security map and for performing a bit-for-bit comparison of the transmitted and stored LINs or LSCs. Should the transmitted LSC fail to match the stored LSC (i.e., be unauthorized), the Switchboard (1) terminates the access request. Should, however, the transmitted LSC prove to be authorized, the prospective user, upon receiving a signal from the Switchboard (1), enters his PICs, preferably through the Workstation's (7) I/O device (3), for transmission over the telephone communications circuit in order to identify himself to the Switchboard (1).

The primary purpose of the entry of PICs is to enable the Switchboard (1) to recognize, by reference to the PIC's stored in its security map, that an unauthorized user is attempting to gain access to the secure computer system (4, 5) and to address such attempted invasion. Software analagous to that employed for performing the bit-for-bit comparisons of the transmitted and stored LINs and LSCs may be employed to perform a bit-for-bit comparison of transmitted and stored PIC data. Since an authorized LIN/LSC combination automatically indicates to the Switchboard (1), either precisely or within close limits, which PICs should follow, unauthorized entries of any level of PIC indicate to the Switchboard (1) that the person attempting to gain access to the secure computer system (4, 5) has no knowledge of authorized PICs and is not an authorized user of the system (4, 5). After some specified number of unauthorized PIC entry retrials, the number being variable depending upon the level of security required, the software executed by the microprocessor (9) of the Switchboard (1) "locks-out" the workstation (7) identified by the authorized LIN/LSC combination from access to the system (4, 5) until such "lock-out" is overridden by security personnel. The term "lock-out" denotes the Switchboard's (1) refusal to allow normal system (4, 5) access to a workstation (7). Once a workstation (7) is locked-out, it can only be reinstated as a functioning unit, from the Switchboard (1), by security personnel. Furthermore, reinitialization of the LRD (2) located at such workstation (7 causes the LIN/LSC combination for the particular LRD (2) to replaced by another, rendering the previous, security-compromised LIN/LSC combination useless. In addition, the entry of PICs limits each particular workstation's (7) capability for computer system (4, 5) access to one or more particular authorized users.

Generally, it is preferred that the entry of no less than two PICs per prospective user be required for such prospective user to gain access to the secure system (4, 5). The PICs should be requested in succession, a succeeding PIC being entered only after a prior PIC has been accepted by the Switchboard (1), the Switchboard (1), by reference to its security map, having determined that such PIC transmitted from a workstation (7) is an authorized PIC for that particular workstation (7) (the particular row of the security map containing the stored PIC used for the comparison is the row previously identified by the transmitted LIN).

It should be noted that while PIC data entry at a remote workstation (7) may be achieved in several ways (for example, through the use of either a magnetic card reader or a conventional punch card or paper tape reader, any of such readers being a part of such workstation's (7) LRD (2) or I/O device (3)), it is preferred, for purposes of maximum security that each user be required to memorize his PICs and enter them manually through the I/O device (3) keyboard.

If the Switchboard determines, by its recognition of the lack of an LIN/LSC/PIC correspondence, that the prospective user is not an authorized user of the workstation (7) identified by the previously transmitted authorized LIN/LSC combination, the Switchboard (1) locks-out such workstation (7). If, however, the Switchboard (1) determines that the PICs entered by the prospective user do, in fact, identify an authorized user of such workstation (7), the Switchboard (1) allows access to the secure computer system (4, 5) and normal remote usage can begin.

Thus, the security system's use of secure LSC initialization and transmission in combination with user entry of PICs ensures computer system (4, 5) access from predetermined and fixed locations (7) only, and limits such access to one or more particular authorized users at each particular location (7).

It is important to understand that the Switchboard (1), being the focal point of the security system, has access to all information regarding system (4, 5) usage. Consequently, the Switchboard (1) has the capacity to collect and save all information regarding system (4, 5) usage. Thus, the Switchboard (1) may compile a data base to function as a usage monitor as well as serve management in its efforts to maintain system (4, 5) security and review user performance.

It is intended that the Switchboard (1) have the capacity to store for display, print, or transfer to a disc or other permanent data storage device the location of each LRD (2) and the authorized user(s) of each location (7). In addition, the Switchboard (1) is to be capable of providing a complete record of terminated and successful access requests highlighting unauthorized PIC entries not resulting in lock-out, lock-outs themselves, and system usage including overtime usage.

It will be clear to one skilled in the art that means must be provided for changing and manipulating information stored in the Switchboard's (1) security map as well as for retrieving information from its data base. Such means may be provided in the form of "windows" that make specific functions available to specific authorized users. Such windows may be accessed by means of a Switchboard (1) protocol that routes a user with window authorization to either the Switchboard (1) operating system itself and its appended data or the protected computer system (4, 5) depending upon a selection made by such user after he has correctly identified himself to the Switchboard (1). Each authorized user's personal "menu" of available windows may be viewed by entry of such user's LSC, PICs, or both. The windows offered in such menus may provide such users with means of fixing the number of remote locations (7) having access to the protected computer system (4, 5); adding or deleting locations (7), LRDs (2), or users from the Switchboard's (1) security map; relocating users or LRDs (2) within the Switchboard's (1) security map; reinitializing LRDs (2); restricting the access rights of selected users or locations (7); overriding lock-outs; retrieving information from the Switchboard's (1) data base; and accomplishing such other ends as may be deemed necessary. The integrity of such windows may be protected by fail-safe and/or rubber stamp provisions that prevent users from making arbitrary changes to the security map.

In addition to facilitating prompt, paperless changes to the Switchboard's (1) security map, the remote access to the Switchboard's (1) operating system and its appended data provided by the aforementioned window mechanism may be utilized to, for example, accomplish the immediate cancellation of the access authorization of a newly terminated user.

It should be noted that the information included in the data base that may be compiled by the Switchboard (1) may also include a complete record of changes made to the Switchboard's (1) security map and other Switchboard (1) usage and resultant activity relating to the aforementioned windows.

It should be noted that in addition to data base capability, the Switchboard (1) may be given the capability to react in accordance with such applicable procedures as may be designed into its protocols (for example, by immediately alerting security personnel) to the occurrence of, for example, a lock-out or an access request from a predetermined location, a location already on-line, a predetermined user, or a user already on-line.

It should be understood that the LSC and PIC data corresponding to a workstation (7) may be used to limit access to particular computer system (4, 5) memory files to particular authorized users at particular workstations (7). That is, since an LSC corresponds to one, and only one, workstation (7) (LRD (2)), a computer system (4, 5) can be programmed to use LSC and PIC data to allow only certain authorized users at certain workstations (7) to access certain memory files.

While separate software housed in the computer system (4, 5) itself is necessary for this to be accomplished in the instance of a Switchboard (1) in the preferred embodiment (a separate dedicated computer), if a Switchboard (1) is embodied in the computer system (4, 5) itself, the necessary software may be executed either as separate software or, preferably (because it eliminates time consuming redundancy in initialization, reinitialization, and user entry procedures), as part of the Switchboard's (1) software.

It will be clear to one skilled in the art that communications circuits other than telephone communications circuits, or a combination of telephone and non-telephone communications circuits, may be used in an embodiment of the computer security system.

Also, it will be clear to one skilled in the art that for some embodiments of the present invention the use of LINs, SNs, and PICs may be considered duplicative and that it is possible to initialize the Switchboard (1), accomplish LRD (2) initialization, and ensure computer system (4, 5) security using only a single PIC. By way of example, secure access to the protected computer system (4, 5) may be ensured by first establishing communication between a remote workstation (7) and the Switchboard (1) and then having such workstation's (7) LRD (2), operated by a prospective user who pushes a control button, read such LRD's (2) LSC from its memory (11) and transmit the datum to the Switchboard (1) without revealing the LSC to the prospective user. Although the read and transmission may be accomplished in many ways well known in the art, no particular way is preferred. Typically, such tasks are accomplished by a microprocessor (12), executing microcode, performing the reading and formatting of the data in combination with a MODEM, connected to the telephone communications circuit, performing the data transmission function. Next, the Switchboard (1) must search its security map for an LSC corresponding to the one transmitted. Depending upon whether the Switchboard (1) is embodied in the preferred embodiment, a separate dedicated computer/microprocessor (9) and memory (10), or in the computer system (4, 5) itself, the means of performing the search may vary and, in any event, are well known in the art. Should the preferred embodiment be employed, the typical processing unit (9) may execute software for reading the various LSCs stored in the security map and for performing a bit-for-bit comparison of the transmitted LSC to such stored LSCs for the purpose of determining whether such transmitted LSC corresponds to a stored LSC (i.e., is authorized). If the Switchboard (1) determines that the transmitted LSC is not authorized, it terminates the access request. If, however, the Switchboard (1) determines that the transmitted LSC is authorized, and is in subsequent receipt of a PIC transmitted to it by the prospective user via the workstation's (7) I/O device (3), the Switchboard (1) must compare such PIC to the PIC(s) stored in its security map in the row identified by the authorized LSC for the purpose of determining whether such PIC is that of an authorized user of the workstation (7) identified by such LSC (i.e., corresponds with the authorized LSC). It will be clear to one skilled in the art that software analagous to that employed for performing the bit-for-bit comparison of the transmitted and stored LSCs may be employed to perform a bit-for-bit comparison of transmitted and stored PIC data. If the Switchboard (1) determines that the transmitted PIC does, in fact, correspond with the authorized LSC, the Switchboard (1) allows access to the secure computer system (4, 5) and normal remote usage can begin. If, on the other hand, no such correspondence exists and the Switchboard (1) determines that the workstation (7) identified by the authorized LSC should be locked-out, additional software may store, in the particular security map row denoted by such LSC, a bit indicating that future access attempts from such workstation (7) should be terminated prior to PIC comparison, thus preventing user access from such locked-out workstation (7).

Having described the invention, what is claimed is:

1. A computer security system comprising a switchboard connected to one or more location recognition devices over one or more communications circuits, said switchboard comprising:

means for storing a security map, said security map including one or more authorized location security codes, each of said authorized location security codes representing a location recognition device at an authorized remote location, said security map further including one or more authorized personal identification codes associated with each of said one or more authorized location security codes;

means, connected to said means for storing a security map and said one or more communications circuits, for comparing a location security code, transmitted to said switchboard from a remote location, to said security map for determining whether said location security code is authorized and for denying access to a computer system from said remote location if said location security code is unauthorized;

means, connected to said means for storing a security map and said one or more communications circuits and responsive to said means for comparing a location security code, for setting a lock-out indicator associated with one of said authorized location security codes in response to a specified number of unauthorized user personal identification codes transmitted from a remote location from which said one of said authorized location security codes has been transmitted; and lock-out means, connected to said means for setting a lock-out indicator, for denying access to said computer system from a remote location from which an authorized location security code has been transmitted if a lock-out indicator associated with said authorized location security code has been set;

each said location recognition device comprising:
   means for receiving a location security code from a source external to said location recognition device;
   means, connected to said means for receiving a location security code, for storing said location security code; and
   means, connected to said means for storing a location security code and a communications circuit, for transmitting a stored location security code to said switchboard.

2. A computer security system as recited in claim 1, wherein said means for setting a lock-out indicator further includes means for comparing a personal identification code, transmitted to said switchboard from a remote location from which said one of said authorized location security codes has been transmitted, to said security map for determining whether said transmitted personal identification code is authorized.

3. The computer security system of claim 1, wherein said source external to said location recognition device is said switchboard.

4. The computer security system of claim 2, wherein the determination that a transmitted personal identification code is unauthorized is based on said transmitted personal identification code's failure to match an authorized personal identification code stored in said security map.

5. The computer security system of claim 1, wherein the determination that a transmitted location security code is unauthorized is based on said transmitted location security code's failure to match an authorized location security code stored in said security map.

6. The computer security system of claim 1, wherein said means for storing a location security code is a volatile memory.

7. The computer security system of claim 6, wherein the location recognition device further includes means for disconnecting said volatile memory means from a source of electrical power.

* * * * *